(12) United States Patent
Atkins et al.

(10) Patent No.: US 11,186,476 B2
(45) Date of Patent: *Nov. 30, 2021

(54) SYSTEMS AND METHODS FOR CONTROLLING DUAL MODULATION DISPLAYS

(71) Applicant: DOLBY LABORATORIES LICENSING CORPORATION, San Francisco, CA (US)

(72) Inventors: Robin Atkins, San Jose, CA (US); Rabab K. Ward, Vancouver (CA)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/114,532

(22) Filed: Dec. 8, 2020

(65) Prior Publication Data

US 2021/0087047 A1     Mar. 25, 2021

Related U.S. Application Data

(63) Continuation of application No. 16/271,696, filed on Feb. 8, 2019, now Pat. No. 10,899,599, which is a
(Continued)

(51) Int. Cl.
*G09G 3/36* (2006.01)
*B67D 7/02* (2010.01)
(Continued)

(52) U.S. Cl.
CPC ......... *B67D 7/0266* (2013.01); *B67D 7/0277* (2013.01); *B67D 7/36* (2013.01);
(Continued)

(58) Field of Classification Search
CPC ...... B67D 7/0266; B67D 7/0277; B67D 7/36; B67D 7/845; G06F 3/1423; G09G 3/3611;
(Continued)

(56) References Cited

U.S. PATENT DOCUMENTS 6,839,048 B2    1/2005  Park
7,064,740 B2 *  6/2006  Daly .................... G09G 3/3426
                                                         345/102
(Continued)

FOREIGN PATENT DOCUMENTS

CN       1755785      4/2006
CN     101010712      8/2007
(Continued)

OTHER PUBLICATIONS

Antoniou, Andreas "Digital Filters: Analysis, Design, and Applications" McGraw-Hill.
(Continued)

*Primary Examiner* — Amit Chatly

(57) ABSTRACT

In one embodiment, a dual modulator display systems and methods for rendering target image data upon the dual modulator display system are disclosed where the display system receives target image data, possible HDR image data and first calculates display control signals and then calculates backlight control signals from the display control signals. This order of calculating display signals and then backlight control signals later as a function of the display systems may tend to reduce clipping artifacts. In other embodiments, it is possible to split the input target HDR image data into a base layer and a detail layer, wherein the base layer is the low spatial resolution image data that may be utilized as for backlight illumination data. The detail
(Continued)

layer is higher spatial resolution image data that may be utilized for display control data.

5 Claims, 7 Drawing Sheets

Related U.S. Application Data continuation of application No. 15/443,705, filed on Feb. 27, 2017, now Pat. No. 10,235,947, which is a continuation of application No. 14/406,471, filed as application No. PCT/US2013/044988 on Jun. 10, 2013, now Pat. No. 9,607,556.

(60) Provisional application No. 61/660,611, filed on Jun. 15, 2012.

(51) Int. Cl.
*H04N 21/4402* (2011.01)
*G09G 3/34* (2006.01)
*G06F 3/14* (2006.01)
*B67D 7/36* (2010.01)
*B67D 7/84* (2010.01)

(52) U.S. Cl.
CPC ......... *G06F 3/1423* (2013.01); *G09G 3/3426* (2013.01); *G09G 3/36* (2013.01); *G09G 3/3611* (2013.01); *H04N 21/440227* (2013.01); *B67D 7/845* (2013.01); *G09G 2320/0238* (2013.01); *G09G 2320/0266* (2013.01); *G09G 2320/0271* (2013.01); *G09G 2320/066* (2013.01); *G09G 2320/0646* (2013.01); *G09G 2320/0666* (2013.01); *G09G 2360/16* (2013.01)

(58) Field of Classification Search
CPC ............ G09G 3/3426; G09G 3/36; G09G 2320/0266; G09G 2320/0666; G09G 2320/0238; G09G 2320/066; G09G 2320/0271; G09G 2320/0646; G09G 2360/16; G09G 5/00; G02F 1/133; H04N 5/57; H04N 21/440227
See application file for complete search history.

(56) References Cited

U.S. PATENT DOCUMENTS

| | | | |
|---|---|---|---|
| 7,377,652 B2 | 5/2008 | Whitehead | |
| 7,419,267 B2 | 9/2008 | Whitehead | |
| 7,737,930 B2 | 6/2010 | Inuzuka | |
| 7,800,822 B2 | 9/2010 | Whitehead | |
| 7,825,938 B2 | 11/2010 | Chen | |
| 7,872,659 B2 | 1/2011 | Seetzen | |
| 7,952,556 B2 | 5/2011 | Honbo | |
| 7,982,822 B2 | 7/2011 | Feng | |
| 8,035,604 B2 | 10/2011 | Seetzen | |
| 8,120,600 B2 | 2/2012 | Mizuta | |
| 8,125,425 B2 | 2/2012 | Whitehead | |
| 8,174,546 B2 | 5/2012 | Whitehead | |
| 8,217,970 B2 | 7/2012 | Whitehead | |
| 8,400,392 B2* | 3/2013 | Kimura | G09G 3/3426 345/102 |
| 8,493,313 B2 | 7/2013 | Damberg | |
| 8,525,933 B2 | 9/2013 | Atkins | |
| 8,531,353 B2 | 9/2013 | Heidrich | |
| 8,531,492 B2 | 9/2013 | Wallener | |
| 8,537,098 B2 | 9/2013 | Atkins | |
| 8,596,816 B2 | 12/2013 | Atkins | |
| 8,681,189 B2 | 3/2014 | Wallener | |
| 8,698,729 B2 | 4/2014 | Ward | |
| 8,711,085 B2 | 4/2014 | Ward | |
| 8,773,477 B2 | 7/2014 | Erinjippurath | |
| 8,786,643 B2 | 7/2014 | Seetzen | |
| 8,890,902 B2 | 11/2014 | Johnson | |
| 9,020,998 B2 | 4/2015 | Longhurst | |
| 9,607,556 B2* | 3/2017 | Atkins | G09G 3/3426 |
| 2005/0248554 A1 | 11/2005 | Feng | |
| 2007/0132956 A1 | 6/2007 | Whitehead et al. | |
| 2007/0153117 A1 | 7/2007 | Lin | |
| 2007/0171670 A1 | 7/2007 | Zagar | |
| 2007/0182700 A1 | 8/2007 | Baba | |
| 2007/0268211 A1 | 11/2007 | Whitehead et al. | |
| 2007/0268224 A1 | 11/2007 | Whitehead et al. | |
| 2007/0268577 A1 | 11/2007 | Whitehead et al. | |
| 2007/0268695 A1 | 11/2007 | Seetzen | |
| 2007/0285587 A1 | 12/2007 | Seetzen | |
| 2008/0043303 A1 | 2/2008 | Whitehead et al. | |
| 2008/0129677 A1* | 6/2008 | Li | G09G 3/3426 345/102 |
| 2008/0170054 A1 | 7/2008 | Chou | |
| 2008/0180383 A1 | 7/2008 | Lin | |
| 2008/0180465 A1 | 7/2008 | Whitehead | |
| 2008/0180466 A1 | 7/2008 | Whitehead | |
| 2008/0252666 A1* | 10/2008 | Chen | G09G 3/2044 345/690 |
| 2008/0272999 A1* | 11/2008 | Kurokawa | G09G 3/3611 345/89 |
| 2008/0284719 A1 | 11/2008 | Yoshida | |
| 2008/0297460 A1 | 12/2008 | Peng et al. | |
| 2009/0160877 A1 | 6/2009 | Peng | |
| 2009/0167751 A1* | 7/2009 | Kerofsky | G09G 3/3611 345/214 |
| 2009/0201320 A1 | 8/2009 | Damberg | |
| 2009/0263037 A1* | 10/2009 | Qiu | G06T 5/009 382/254 |
| 2009/0267879 A1 | 10/2009 | Masuda | |
| 2009/0284459 A1 | 11/2009 | Wallener | |
| 2009/0295705 A1* | 12/2009 | Chen | G09G 3/3611 345/102 |
| 2009/0322800 A1 | 12/2009 | Atkins | |
| 2010/0020003 A1 | 1/2010 | Feng | |
| 2010/0052575 A1 | 3/2010 | Feng | |
| 2010/0091045 A1* | 4/2010 | Heidrich | H04N 9/3126 345/690 |
| 2010/0110112 A1 | 5/2010 | Nakanishi | |
| 2010/0123651 A1* | 5/2010 | Miller | G09G 3/3208 345/77 |
| 2010/0134158 A1 | 6/2010 | Pignol et al. | |
| 2010/0214282 A1 | 8/2010 | Whitehead et al. | |
| 2010/0220048 A1 | 9/2010 | Yamamura | |
| 2010/0225574 A1 | 9/2010 | Fujiwara | |
| 2010/0231603 A1 | 9/2010 | Kang | |
| 2010/0238189 A1* | 9/2010 | Feng | G09G 3/3426 345/589 |
| 2010/0277515 A1 | 11/2010 | Ward et al. | |
| 2010/0328537 A1 | 12/2010 | Davies | |
| 2011/0025728 A1 | 2/2011 | Baba | |
| 2011/0032248 A1 | 2/2011 | Atkins | |
| 2011/0050739 A1 | 3/2011 | Namioka | |
| 2011/0057961 A1 | 3/2011 | Tsuru | |
| 2011/0115827 A1 | 5/2011 | Tanaka | |
| 2011/0134158 A1 | 6/2011 | Onishi | |
| 2011/0148900 A1 | 6/2011 | Feng | |
| 2011/0148941 A1 | 6/2011 | Kim | |
| 2011/0169881 A1 | 7/2011 | Wallener | |
| 2011/0193610 A1 | 8/2011 | Longhurst | |
| 2011/0193895 A1 | 8/2011 | Johnson | |
| 2011/0193896 A1 | 8/2011 | Johnson | |
| 2011/0227900 A1 | 9/2011 | Wallener | |
| 2011/0267383 A1 | 11/2011 | Murakami | |
| 2011/0273495 A1 | 11/2011 | Ward | |
| 2011/0279749 A1 | 11/2011 | Erinjippurath | |
| 2011/0298839 A1 | 12/2011 | Nakanishi | |
| 2012/0026405 A1 | 2/2012 | Atkins | |
| 2012/0062607 A1 | 3/2012 | Erinjippurath | |
| 2012/0063121 A1 | 3/2012 | Atkins | |
| 2012/0075360 A1 | 3/2012 | Messmer | |
| 2012/0092360 A1 | 4/2012 | Kang | |
| 2012/0092395 A1 | 4/2012 | Seetzen | |

(56) References Cited

U.S. PATENT DOCUMENTS

| | | | |
|---|---|---|---|
| 2012/0113167 A1 | 5/2012 | Margerm | |
| 2012/0113498 A1 | 5/2012 | Margerm | |
| 2012/0133689 A1 | 5/2012 | Kwong | |
| 2012/0140446 A1 | 6/2012 | Seetzen et al. | |

FOREIGN PATENT DOCUMENTS

| | | |
|---|---|---|
| CN | 101202017 | 6/2008 |
| CN | 101286300 | 10/2008 |
| CN | 102103840 | 6/2011 |
| CN | 102334062 B | 1/2012 |
| CN | 102667904 B | 9/2012 |
| JP | 0736021 | 2/1995 |
| JP | 2006113535 | 4/2006 |
| JP | 2008262032 | 10/2008 |
| JP | 2010008837 | 1/2010 |
| JP | 2010085946 A | 4/2010 |
| JP | 5814043 | 11/2015 |
| KR | 20080092581 | 10/2008 |
| WO | 2005011293 | 2/2005 |
| WO | 2006010244 | 2/2006 |
| WO | 2008033502 | 3/2008 |
| WO | 2008145027 | 12/2008 |
| WO | 2010093433 | 8/2010 |
| WO | 2010150299 | 12/2010 |
| WO | 2011163114 | 12/2011 |

OTHER PUBLICATIONS

Artamonov, Oleg, "Contemporary LCD Monitor Parameters: Objective and Subjective Analysis" X-bit Labs, Jan. 23, 2007.
Barnhoefer, B. et al "A Low Power, Passively Cooled 2000 cd/m2 Hybrid LED-LCD Display" IEEE International Symposium on Consumer Electronics, 2006, pp. 1-4.
Barten, Peter G.J. "Contrast Sensitivity of the Human Eye and its Effects on Image Quality" SPIE Press, 1999.
California Energy Commission "Appliance Efficiency Regulations Pertaining to Television Efficiency" Jul. 14, 2010.
Chiu, Ching-Te, et al "A 100MHz Real-Time Tone Mapping Processor with Integrated Photographic and Gradient Compression in 0.13 um Technology" IEEE Workshop on Signal Processing Systems, Oct. 8-10, 2008, pp. 25-30.
Chiu, Ching-Te, et al "Real-Time Tone-Mapping Processor with Integrated Photographic and Gradient Compression Using 0.13 um Technology on an Arm Soc Platform" Journal of Signal Processing Systems, Jul. 2011, vol. 64, Issue 1, pp. 93-107.
Cristaldi, D. et al "Liquid Crystal Display Drivers p-Techniques and Circuits" Springer, Apr. 7, 2009.
Daly, Scott, J. "Visible Differences Predictor: An Algorithm for the Assessment of Image Fidelity" Proc. SPIE 1666, Human Vision, Visual Processing, and Digital Display III, Aug. 27, 1992, 14 pages.
Display Search, "Advanced Quarterly Global TV Shipment and Forecast Report", Santa Clara, CA 2012.
Guarnieri, G. et al "Image-Splitting Techniques for a Dual-Layer High Dynamic Range LCD Display", Journal of Electronic Imaging 17(4), Oct.-Dec. 2008.
Guarnieri, G. et al "Minimum-Error Splitting Algorithm for a Dual Layer LCD Display—Part 1: Background and Theory" Journal of Display Technology, vol. 4, No. 4, Dec. 2008, pp. 383-390.
Guarnieri, G. et al "Minimum-Error Splitting Algorithm for a Dual Layer LCD Display—Part II: Implementation and Results" Journal of Display Technology, vol. 4, No. 4, Dec. 2008, pp. 391-397.
Hunt, R.W.G. "The Reproduction of Colour, 6th Edition" Oct. 2004, Wiley—IS&T Series in Imaging Science.
Hunt, R.W.G. "The Reproduction of Colour, 6th Edition" Oct. 2004, Wiley—IS&T Series in Imaging Science.
Hurley, James B. "Shedding Light on Adaptation", Journal of General Physiology 119, p. 125-128, Jan. 17, 2002.
Jiangtao, K. et al "Evaluation of HDR Tone Mapping Algorithms Using a High-Dynamic-Range Display to Emulate Real Scenes" 15th Color and Imaging Conference Final Program and Proceedings, pp. 299-305, published on Jan. 1, 2007.
Kunkel, T. et al "A Reassessment of the Simultaneous Dynamic Range of the Human Visual System" Proc. of the 7th Symposium on Applied Perception in Graphics and Visualization, pp. 17-24, New York, NY, USA 2010.
Li, F. et al "Two Approaches to Derive LED Driving Signals for High-Dynamic-Range LCD Backlights" SID Symposium, Seminar & Exhibition held in Long Beach, CA, May 20-25, 2007.
Lin, Fang-Cheng et al "Inverse of Mapping Function (IMF) Method for Image Quality Enhancement of High Dynamic Range LCD TVs" SID Symposium Digest of Technical Papers, vol. 38, Issue 1, pp. 1343-1346, May 2007.
Lin, W. et al, "Perceptual Visual Quality Metrics: A Survey" Journal of Visual Communication and Image Representation, vol. 22, Issue 4, May 2011, pp. 297-312.
Lo, Mei-Chun, et al "High Dynamic Range Imaging Techniques Based on Both Color-Separation Algorithms Used in Conventional Graphic Arts and the Human Visual Perception Modeling" Proc. SPIE 7537 Digital Photography, Jan. 18, 2010.
Mantiuk, R. et al "Visible Difference Predicator for High Dynamic Range Images" IEEE International Conference on Systems, Man and Cybernetics, vol. 3, Oct. 10-13, 2004, pp. 2763-2769.
Naka, K. I et al "S-Potentials from Luminosity Units in the Retina of Fish (*Cyprinidae*)" The Journal of Physiology, 185, pp. 587-599, Aug. 1966.
Palmer, Stephen E. "Vision Science: Photons to Phenomenology" May 7, 1999, A Bradford Book.
Park, Bong-Ryeol et al "Thermal Consideration in LED Array Design for LCD Backlight Unit Applications" IEICE Electronics Express, vol. 7, No. 1, 40-46, published on Jan. 20, 2010.
Reinhard, E. et al "High Dynamic Range Imaging: Acquisition, Display, and Image-Based Lighting (The Morgan Kaufmann Series in Computer Grfaphics)" Morgan Kaufmann Publishers, Inc., San Francisco, CA 2005.
Seetzen, H. et al "A High Dynamic Range Display Using Low and High Resolution Modulators" SID Symposium Digest of Technical Papers vol. 34, Issue 1, pp. 1450-1453, May 2003.
Seetzen, H. et al. "High Dynamic Range Display Systems" SIGGRAPH, ACM pp. 760-768, vol. 23, Issue 3, Aug. 2004.
The Commission of the European Communities Commission Regulation (EC) No. 642/2009, Jul. 22, 2009, Office Journal of the European Union.
Trentacoste, Matthew "Photometric Image Processing for High Dynamic Range Displays" University of British Columbia, Jan. 2006.
Wang, Tsun-Hsien, et al "Block-Based Gradient Domain High Dynamic Range Compression Design for Real-Time Applications" IEEE International Conference on Image Processing, vol. 3, Sep. 16, 2007-Oct. 19, 2007, pp. III-561-III-564.
Wang, Z. "Multi-Scale Structural Similarity for Image Quality Assessment" IEEE Conference Records of the Thirty-Seventh Asilomar Conference on Signals, Systems and Computers, Nov. 9-12, 2003, pp. 1398-1402, vol. 2.
Wang, Z. et al "Image Quality Assessment: From Error Visibility to Structural Similarity" IEEE Transactions on Image Processing, vol. 13, No. 4, Apr. 2004.
Ware, Colin, "Information Visualization, Second Edition: Perception for Design (Interactive Technologies)" Apr. 21, 2004, Morgan Kaufmann.
Wilkinson, S. "Ultimate Vizio" May 2009.
Yeganeh, H. et al "Objective Assessment of Tone Mapping Algorithms" Proc. of 2010 IEEE 17th International Conference on Image Processing, Sep. 26-29, 2010, Hong Kong.

\* cited by examiner

SYSTEMS AND METHODS FOR CONTROLLING DUAL MODULATION DISPLAYS

CROSS-REFERENCE TO RELATED APPLICATIONS

This application is a continuation of U.S. patent application Ser. No. 16/271,696 filed Feb. 8, 2019, which is a continuation of U.S. patent application Ser. No. 15/443,705 filed Feb. 27, 2017, now U.S. Pat. No. 10,235,947, which is a continuation of U.S. patent application Ser. No. 14/406,471 filed Dec. 8, 2014, U.S. Pat. No. 9,607,556, which is a National Phase of International Application No. PCT/US2013/044988 filed Jun. 10, 2013, which claims priority to U.S. Provisional Application No. 61/660,611 filed Jun. 15, 2012, each of which is hereby incorporated by reference in its entirety.

TECHNICAL FIELD

The present invention relates to displays systems and, more particularly, to novel methods and systems for controlling dual modulation displays.

BACKGROUND

In the field of image and/or video processing, it is known that dual modulations display systems may render high dynamic range images and video. For example, the following, co-owned, patent applications disclose similar subject matter: (1) United States Patent Application 20070268224 to Whitehead et al., published Nov. 22, 2007 and entitled "HDR DISPLAYS WITH DUAL MODULATORS HAVING DIFFERENT RESOLUTIONS"; (2) United States Patent Application 20070285587 to Seetzen, published Dec. 13, 2007 and entitled "DRIVING DUAL MODULATION DISPLAY SYSTEMS USING KEY FRAMES"; (3) United States Patent Application 20080043303 to Whitehead et al., published Feb. 21, 2008 and entitled "HDR DISPLAYS WITH OVERLAPPING DUAL MODULATION"; (4) United States Patent Application 20080180465 to Whitehead et al., published Jul. 31, 2008 and entitled "APPARATUS AND METHODS FOR RAPID IMAGE RENDERING ON DUAL-MODULATOR DISPLAYS"; (5) United States Patent Application 20080180466 to Whitehead et al., published Jul. 31, 2008 and entitled "RAPID IMAGE RENDERING ON DUAL-MODULATOR DISPLAYS"; (6) United States Patent Application 20100214282 to Whitehead et al., published Aug. 26, 2010 and entitled "APPARATUS FOR PROVIDING LIGHT SOURCE MODULATION IN DUAL MODULATOR DISPLAYS"; (7) United States Patent Application 20120092360 to Kang et al., published Apr. 19, 2012 and entitled "DUAL MODULATION USING CONCURRENT PORTIONS OF LUMINANCE PATTERNS IN TEMPORAL FIELDS"; (8) United States Patent Application 20090201320 to Damberg et al., published Aug. 13, 2009 and entitled "TEMPORAL FILTERING OF VIDEO SIGNALS"; (9) United States Patent Application 20090284459 to Wallener et al., published Nov. 19, 2009 and entitled "ARRAY SCALING FOR HIGH DYNAMIC RANGE BACKLIGHT DISPLAYS AND OTHER DEVICES"; (10) United States Patent Application 20090322800 to Atkins, published Dec. 31, 2009 and entitled "METHOD AND APPARATUS IN VARIOUS EMBODIMENTS FOR HDR IMPLEMENTATION IN DISPLAY DEVICES"; (11) United States Patent Application 20100277515 to Ward et al., published Nov. 4, 2010 and entitled "MITIGATION OF LCD FLARE"; (12) United States Patent Application 20100328537 to Davies et al., published Dec. 30, 2010 and entitled "SYSTEM AND METHOD FOR BACKLIGHT AND LCD ADJUSTMENT"; (13) United States Patent Application 20110032248 to Atkins, published Feb. 10, 2011 and entitled "RETENTION AND OTHER MECHANISMS OR PROCESSES FOR DISPLAY CALIBRATION"; (14) United States Patent Application 20110169881 to Wallener et al., published Jul. 14, 2011 and entitled "SYSTEM AND METHODS FOR APPLYING ADAPTIVE GAMMA IN IMAGE PROCESSING FOR HIGH BRIGHTNESS AND HIGH DYNAMIC RANGE DISPLAYS"; (15) United States Patent Application 20110193610 to Longhurst, published Aug. 11, 2011 and entitled "EFFICIENT COMPUTATION OF DRIVING SIGNALS FOR DEVICES WITH NON-LINEAR RESPONSE CURVES"; (16) United States Patent Application 20110227900 to Wallener, published Sep. 22, 2011 and entitled "CUSTOM PSFS USING CLUSTERED LIGHT SOURCES": (17) United States Patent Application 20110273495 to Ward et al., published Nov. 10, 2011 and entitled "APPARATUS AND METHODS FOR COLOR DISPLAYS"; (18) United States Patent Application 20110279749 to Erinjippurath et al., published Nov. 17, 2011 and entitled "HIGH DYNAMIC RANGE DISPLAYS USING FILTERLESS LCD(S) FOR INCREASING CONTRAST AND RESOLUTION"; (19) United States Patent Application 20120062607 to Erinjippurath et al., published Mar. 15, 2012 and entitled "METHOD AND APPARATUS FOR EDGE LIT DISPLAYS"; (20) United States Patent Application 20120075360 to Messmer, published Mar. 29, 2012 and entitled "SYSTEMS AND METHODS FOR CONTROLLING DRIVE SIGNALS IN SPATIAL LIGHT MODULATOR DISPLAYS"; (21) United States Patent Application 20120092395 to Seetzen, published Apr. 19, 2012 and entitled "EDGE-LIT LOCAL DIMMING DISPLAYS, DISPLAY COMPONENTS AND RELATED METHODS"; (22) United States Patent Application 20120113167 to Margerm et al., published May 10, 2012 and entitled "REDUCED POWER DISPLAYS"; (23) United States Patent Application 20120113498 to Margerm et al., published May 10, 2012 and entitled "CONTROL OF ARRAY OF TWO-DIMENSIONAL IMAGING ELEMENTS IN LIGHT MODULATING DISPLAYS"; (24) United States Patent Application 20120133689 to Kwong, published May 31, 2012 and entitled "REFLECTORS WITH SPATIALLY VARYING REFLECTANCE/ABSORPTION GRADIENTS FOR COLOR AND LUMINANCE COMPENSATION"; (25) United States Patent Application 20120140446 to Seetzen et al., published Jun. 7, 2012 and entitled "OPTICAL MIXING AND SHAPING SYSTEM FOR DISPLAY BACKLIGHTS AND DISPLAYS INCORPORATING THE SAME"; (26) United States Patent Application 20120026405 to Atkins et al., published Feb. 2, 2012 and entitled "SYSTEM AND METHOD OF CREATING OR APPROVING MULTIPLE VIDEO STREAMS"; (27) United States Patent Application 20120063121 to Atkins, published Mar. 15, 2012 and entitled "MULTI-DIE LED PACKAGE AND BACKLIGHT UNIT USING THE SAME"; (28) United States Patent Application 20070268211 to Whitehead et al., published Nov. 22, 2007 and entitled "HDR DISPLAYS WITH INDIVIDUALLY-CONTROLLABLE COLOR BACKLIGHTS"; (29) United States Patent Application 20070268577 to Whitehead et al., published Nov. 22, 2007 and entitled "HDR DISPLAYS HAVING LOCATION SPE- CIFIC MODULATION"; (30) United States Patent Application 20070268695 to SEETZEN, published Nov. 22, 2007 and entitled "WIDE COLOR GAMUT DISPLAYS"; (31) United States Patent Application 20100091045 to Heidrich et al., published Apr. 15, 2010 and entitled "MULTIPLE MODULATOR DISPLAYS AND RELATED METHOD"—all of which are incorporated by reference in their entirety.

SUMMARY

Several embodiments of display systems and methods of their manufacture and use are herein disclosed.

Several embodiments of systems and methods are disclosed that perform novel rendering of target images upon high dynamic range displays and, in particular, to those displays that have a dual modulation scheme and/or architecture.

In one embodiment, a system and/or method is disclosed that comprises steps and/or modules for initially determining LCD image values for rendering a target image and then employs such LCD image values to determine a backlight for the target image.

In one embodiment, a dual modulator display systems and methods for rendering target image data upon the dual modulator display system are disclosed where the display system receives target image data, possible HDR image data and first calculates display control signals and then calculates backlight control signals from the display control signals. This order of calculating display signals and then backlight control signals later as a function of the display systems may tend to reduce clipping artifacts.

In other embodiments, it is possible to split the input target HDR image data into a base layer and a detail layer, wherein the base layer is the low spatial resolution image data that may be utilized as for backlight illumination data. The detail layer is higher spatial resolution image data that may be utilized for display control data.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

Figure 1:
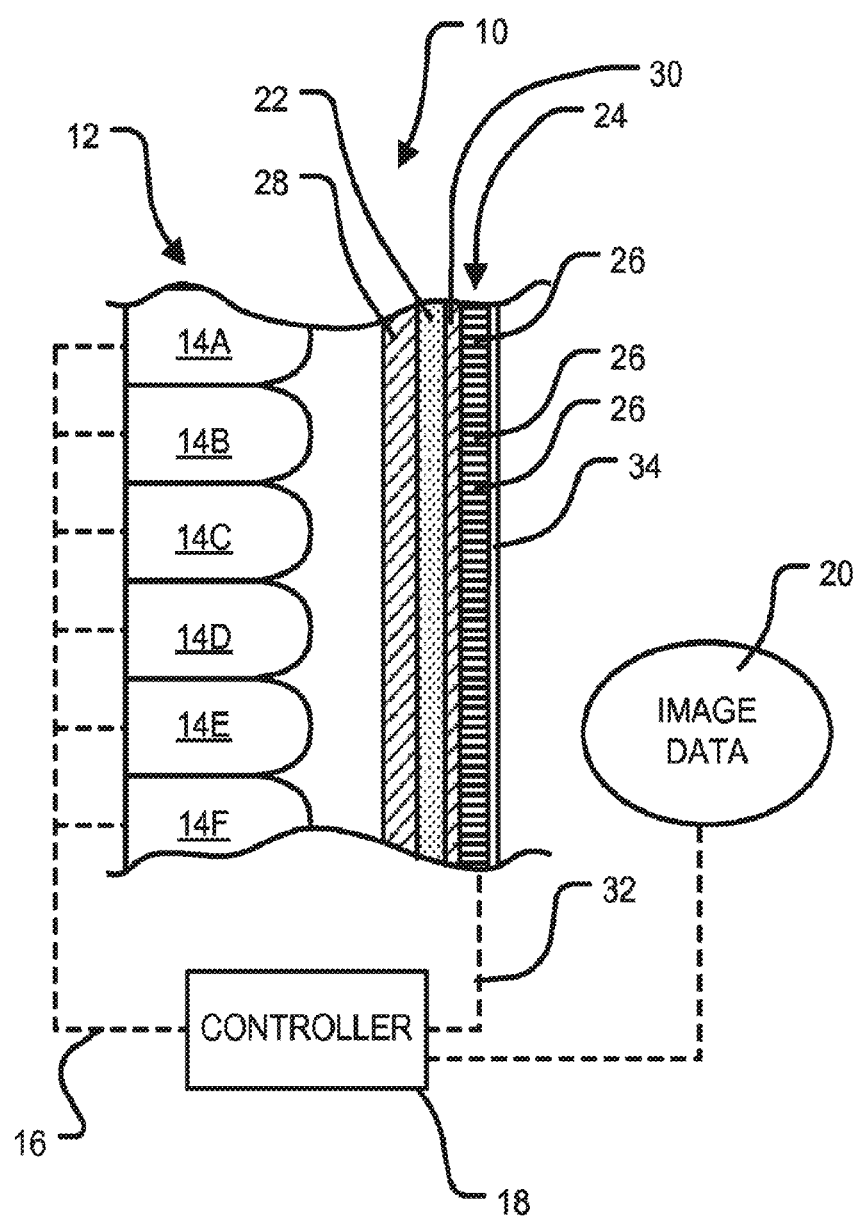
FIG. 1 shows one exemplary of an HDR display system suitable for the purposes of the present application.

High dynamic range (HDR) displays are well-known in the art. FIG. 1 is merely one exemplary HDR display comprising a dual modulation architecture—as detailed further in the '282 application (as incorporated by reference above). FIG. 1 is a partial cross-sectional diagram of a dual modulator display 10 according to a particular embodiment. Display 10 may be similar in many respects to the displays disclosed in the Dual Modulator Display Applications. For clarity, some features of display 10 not germane to the present invention are not explicitly shown in FIG. 1. Display 10 comprises a phosphorescent plate 22 located in the optical path between light source modulation layer 12 and display modulation layer 24. Phosphorescent plate 22 comprises one or more phosphorescent materials which are energized by spatially modulated light received from light source modulation layer 12. In currently preferred embodiments, the spatial modulation provided by display modulation layer 24 has a higher resolution than the spatial modulation provided by light source modulation layer 12, although this is not necessary.

Display 10 comprises a controller 18. Controller 18 may comprise any combination of hardware and software capable of operating as described herein. By way of non-limiting example, controller 18 may comprise one or more suitably programmed data processors, hard-wired or configurable logic elements, memory and interface hardware and/or software. The data processors of controller 18 may comprise one or more programmable computers, one or more embedded processors or the like. As explained in more detail below, controller 18 may control the operation of light source modulation layer 12 using drive signals 16 and display modulation layer 24 using drive signals 32.

In the illustrated embodiment, light source modulation layer 12 is implemented by an array of individually addressable LEDs 14A, 14B, 14C, 14D, 14E, 14F (collectively, LEDs 14). In other embodiments, LEDs 14 may be replaced with or supplemented with lasers, OLEDs, quantum dots. As described in the Dual Modulator Display Applications, light source modulator 12 may be implemented using other components. By way of non-limiting example, light source modulator 12 may be implemented by: an array of controllable light sources of a type different than LEDs; one or more light sources and a light modulator disposed to spatially modulate the intensity of the light from the one or more light sources; and some combination of these.

Light source modulation layer 12 outputs spatially modulated light in response to driving signals 16 received from controller 18 further in response to input image data 20. Light source modulation layer 12 may emit spatially modulated light with central wavelengths at or near the blue/violet end of the visible spectrum. Light source modulation layer 12 may additionally or alternatively emit ultraviolet light (i.e. with central wavelengths below those of the visible spectrum). At these wavelengths, the photons emitted by light source modulation layer 12 have energies that are relatively high (compared to photons in the visible spectrum). Consequently, when excited, the one or more phosphorescent materials on phosphorescent plate 22 can emit light having desired spectral characteristics in the visible spectrum. In some example embodiments where light source modulation layer 12 emits visible light, the spatially modulated light emitted by light source modulation layer 12 includes light having a central wavelength less than 490 nm. In other embodiments, this central wavelength is less than 420 nm. In other embodiments, light source modulation layer 12 may emit ultraviolet light having central wavelengths less than 400 nm.

It will be appreciated that other HDR displays with different dual modulations schemes and architectures are possible and suitable for the purposes of the present application—and are herein incorporated by reference above.

One Conventional Driving Method

Figure 2:
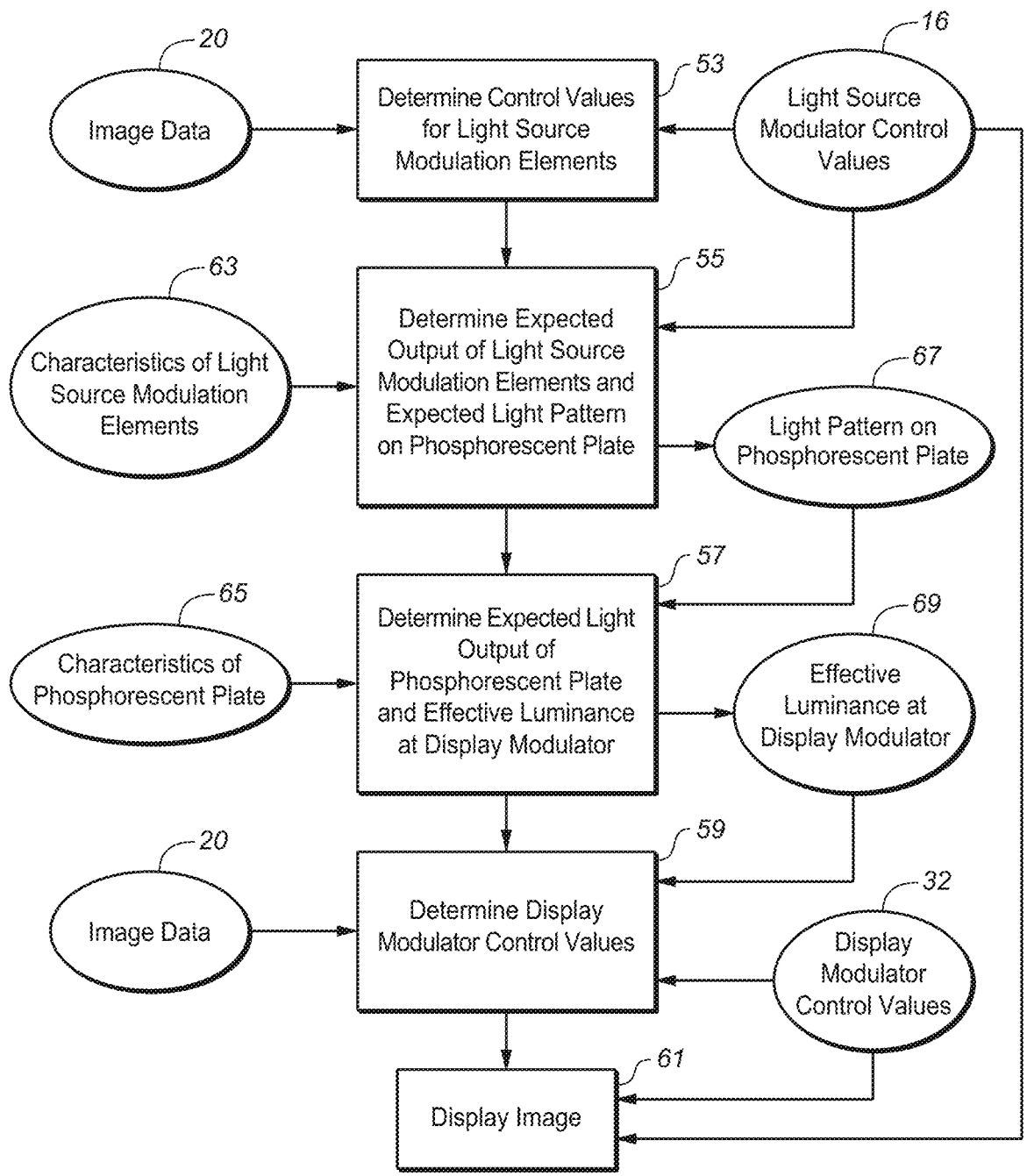
FIG. 2 shows one exemplary image processing algorithms for rendering a target image upon an HDR display system, such as shown in FIG. 1.

In the '282 application, there is described one conventional method for processing image rendering upon such a dual modulation HDR display. The description of the method reads in relevant part as below:

FIG. 2 depicts a method for displaying an image on display 10 according to an example embodiment. The method may be performed in whole or in part by controller 18. The method comprises determining drive signals 16 for light source modulation layer 12 and determining drive signals 32 for light source modulation layer 24 and using drive signals 16, 32 to display an image in block 61. The method begins in block 53 which involves using image data 20 to determine control values 16 for light source modulation layer 12. The block 53 techniques for determining modulation layer drive values 16 using image data 20 are known to those skilled in the art and, by way of non-limiting example, may include, nearest neighbor interpolation techniques which may be based on factors such as intensity and color.

The method then proceeds to block 55 which involves estimating the output of light source modulation elements (e.g. LEDs 14) and the corresponding light pattern 67 received at phosphorescent plate 22. To determine light pattern 67 received at phosphorescent plate 22, block 55 may incorporate light source modulation layer control values 16 and the response characteristics 65 of the light source modulation elements (e.g. LEDs 14). Response characteristics 65 of LEDs 14 may comprise their point spread functions.

The method then proceeds to block 57, which involves using the expected light pattern 67 on phosphorescent plate 22 together with the phosphorescent plate response characteristics 65 to estimate the expected light output of phosphorescent plate 22 and the corresponding effective luminance 69 at display modulation layer 24.

In some embodiments, blocks 55 and 57 may be combined to estimate effective display modulation layer luminance 69 by incorporating phosphorescent plate characteristics 65 into the characteristics 63 of light source modulation elements (e.g. LEDs 14). For example, the transfer function response of phosphorescent plate 22 may be incorporated into the point spread function of LEDs 14. In such embodiments, block 55 and 57 may be replaced by a single block where effective display modulation layer luminance 69 is determined directly from light source modulator control values 16 together with the modified point spread function of LEDs 14. In some embodiments, blocks 55 and/or 57 and/or the combination of blocks 55 and 57 may comprise using techniques for reducing the computational expense associated with these procedures, such as those techniques described in PCT patent publication No. WO2006/010244. By way of non-limiting example, any or all of the resolution reduction, point spread function decomposition, 8-bit segmentation and/or interpolation techniques may be used to determine effective display modulation layer luminance 69.

After estimating effective display modulation layer luminance 69, the method proceeds to block 59 which involves determining display modulator control values 32. The block 59 determination may be based at least in part on image data 20 together with the estimated effective display modulation layer luminance 69. Block 59 may involve dividing image data 20 by effective luminance pattern 69 to obtain raw modulation data for light source modulation layer 24. In some cases, block 59 may also involve modification of this raw modulation data to address issues such as non-linearities or other issues which may cause artifacts to thereby obtain display modulator control values 32. Such modification techniques may be known to those skilled in the art and may comprise, by way of non-limiting example, scaling, gamma correcting, value replacement operations etc.

The method then proceeds to block 61 which involves using light source modulator control values 16 to drive light source modulation elements (e.g. LEDs 14) and display modulator control values 32 to drive the elements of display modulation layer 24 to thereby display the image.

Potential Effects of Conventional Image Processing

One feature of the conventional image processing technique detailed above is that the backlight values are discerned from the source image and subsequently employed to determine the LCD (or display modulator) shutter and/or control values. Such previous control algorithms for dual modulation displays may exhibit have two possible effects:

The first effect may be an LCD (or display modulator) clipping artifact in certain images. Dual modulation displays may not able to reconstruct high frequency and high contrast edges in certain target images. This may result in clipped pixels, which are groups of pixels which have lost all texture or contrast information. This may make an image look "plastic" or "flat".

A second effect may be computational complexity. In some control processes, simulating the light field may have to be done accurately, which may employ heavy computation and memory requirements in addition to accurate models and measurements of the display.

LCD Clipping Artifact

The conventional dual modulation algorithms described above determines the LCD drive values for a given target image and simulated backlight light field. This may typically be accomplished by dividing the target image by the light field for each pixel:

$$\text{LCD} = (\text{Target Image})/(\text{Light Field}) \quad \text{Equ. 1}$$

When the light field matches the target image, the LCD is fully open (i.e., =1). When the target image is slightly less than the light field (such as ½), the LCD is controlled so that the light transmitted is reduced by 50% to correct for the difference.

However, there are two situations when the LCD may be unable to correct for a difference between the light field and the target image. The first situation is if there is less light produced by the light field than that required by the target image (Light Field<Target Image). In this case, the resulting LCD signal is greater than one. As the LCD is not physically able to produce light (this would be >1), the signal is limited to less than or equal to one—that is, the signal is clipped. Clipping, however, tends to remove contrast in an image. Consider the example of a car headlight at night that is bright and contains detailed structure of the lens. If there is not enough light in this region of the backlight, the resulting image will be too dim and will lose the structure detail of the lens. Considering that contrast is detectable by the human visual system, this loss of contrast tends to be an undesirable artifact.

In addition to losing contrast information, image regions that are clipped may also tend to be less bright than intended, since the desired LCD signal was actually an impossible light-producing signal to correct for insufficient light in the backlight. If this corresponds to a dark, barely visible portion of the image, this may render that portion invisible. If this corresponds to a bright portion of the image such as a sun, it may appear dimmer than desired, reducing the visual impact of the image.

The second situation where the LCD may not be able to correct for the light field is where there is too much light produced by the backlight (Light Field>>Target Image). Due to light leakage through the LCD, it may not be possible to adequately block the light produced by the light field. In this case, the desired LCD intensity to correct for the backlight can be zero or below the minimum digital drive value. Consider a dark area of an image, with target light level of only 0.1% of the maximum. If the light field in that region is very bright, for example 50% of maximum, then the LCD drive signal for that region will be 0.1/50, or 0.002%. For an 8-bit LCD panel, this is less than the first code value. The result is that in this region, detailed texture information may be clipped to a black LCD value. It will also appear brighter than desired.

Consider, for another example, a dark bird flying in front of a bright sky. In the target image, the dark bird has detailed texture information for its feathers. However, since it is a small dark feature in front of the bright sky, the backlight light field is very bright in that region. As the LCD attempts to block the excess light produced by the backlight, all the detail in the bird's feathers tends to be clipped, and it may appear as a dark grey due to light leakage.

In general, clipping of the LCD may be avoided by ensuring that the backlight light field is as close as possible to the target image, and in one embodiment, erring on the "too bright" side. However, due to the low spatial resolution of the backlight, this is not possible for small image features and high contrast boundaries. Also, because the light at each pixel is the sum of the contribution of many surrounding backlight elements, it may not be possible to balance between producing too much light for one region and not enough light for another region.

Figure 3:
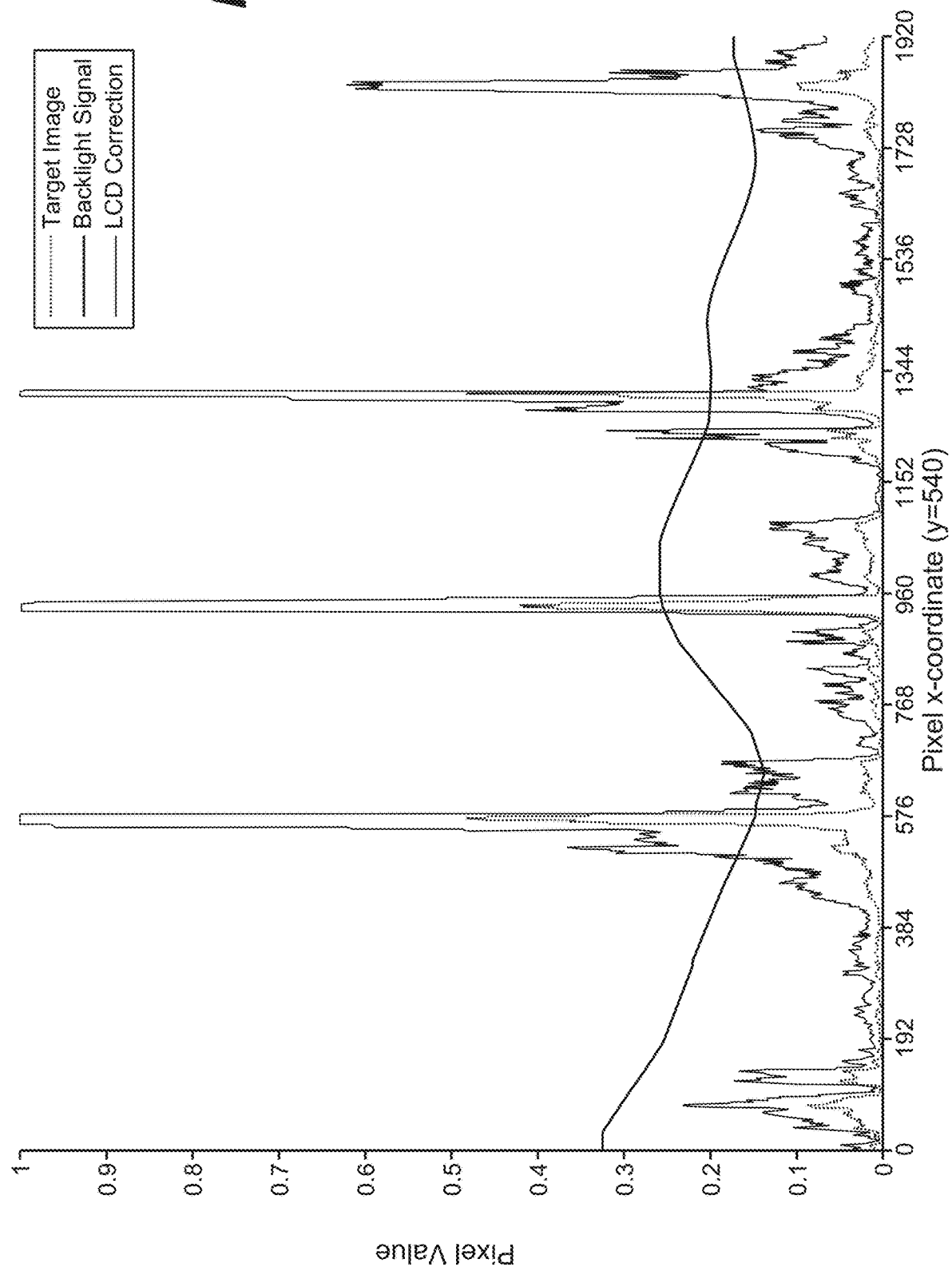
FIG. 3 shows potential LCD clipping artifacts on an putative image as a result of performing an image processing algorithm similar to one given in FIG. 2.

FIG. 3 is a cross-sectional graph of relevant image rendering values across an exemplary image in the x-direction. Such relevant image rendering values shown in FIG. 3 include: the pixel values for the corresponding target image, light field simulation values, and LCD correction values. It may be seen from FIG. 3 that the target image signal does not extend beyond 50% of maximum for this cross section. There are shown three brighter regions are surrounded by very dark pixel values in this exemplary image. The backlight in this region is calculated to hover around 20%, which is quite reasonable for such a dark image. It may be seen, however—that when there is an attempt to compensate the LCD signal for the low backlight intensity in those same three brighter regions—the LCD signal is clipped to one in these three regions. These three clipped regions tend to have lost contrast information, this degrading the image.

Computational Complexity

The light field simulation models the spread of light through the display in order to predict the physical light field that will be produced for a given set of backlight control values. The spread of light from each backlight element through the display optics is termed the point spread function (PSF). The simulation should be done as accurately as possible so that the LCD correction can be performed accurately to achieve the target image. The approach generally taken for this is to perform a convolution of the backlight drive values with the measured or modeled PSF from each backlight element. This can be implemented in a number of ways within hardware or software by accumulating the results of multiple separable filters.

For most displays with locally modulated backlight, this step utilizes a large share of the computational resources due to the large size of the spatial filters that may be used to model the small contribution of light from very distant backlight elements. The large spatial filters may buffer significant portions of the image into memory (e.g., nearly an entire frame)—in addition to large footprints in FPGA architectures. This may result in high cost for the chip and memory, as well as increased power and system latency. As the number of backlight elements or desired frame rates increase, this step tends to use even greater resources.

In addition to the computational cost, this approach may use accurate models of the display optics and calibration. Small errors in the model or measurements may lead to large over or under-estimations of the light field, which then propagate to large errors in the LCD compensation. For example, suppose a target image has a luminance intensity of light in a dark region of 0.1 cd/m2. The light produced by the backlight in the region may be measured at 0.11 cd/m2—a perfectly good value for the region—as the LCD may block the extra 10% of luminance. However, due to inaccuracies of the light field simulation, the system may model the light in the region as 0.09 cd/m2. This results in the case where the (light field<target image), and may cause the LCD to be fully open in the region, rather than partially closed. This may result in the region being: (a) too bright, and (b) clipped of any texture detail. Highly accurate measurements, models, and computations may avoid this—but at a greater cost of computation.

One Embodiment

Figure 4:
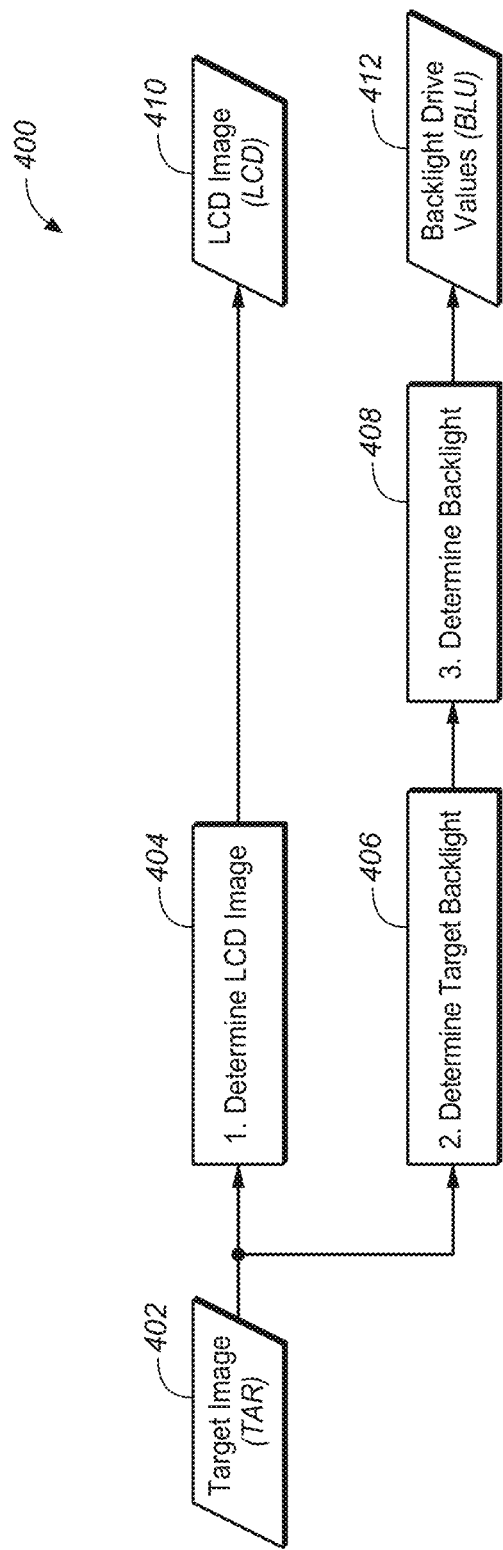
FIG. 4 is one embodiment of an image processing system and/or method made in accordance with the principles of the present application.

FIG. 4 is one embodiment of a present system and/or method for rendering target images on an HDR display. Embodiment 400 receives as input target image 402. Embodiment 400 thereafter processes the target image to determine the LCD (or display modulator) image and/or shutter valves to render the image at block 404. As may be seen from FIG. 4, the LCD values are input (together with target image data) into block 406—where the backlight illumination of the target image is determined. Once the target image backlight illumination is determined, the backlight control signals for the emitters comprising the backlight of the display may be determined at block 408 that will be utilized to drive the backlight in a desired manner for rendering the target image upon the HDR display. The values for the LCD image are then sent to drive the LCD shutter values (or otherwise, display control signals) at 410. In addition, the backlight control signal values are sent to drive the backlights at 412.

In one embodiment of a display system, blocks 402, 406, 408, 410 and 412 may comprise functioning hardware and/or firmware modules of the controller of the display system. Such controller configuration may take receive target image data and output display control signals (e.g. for individual modulation elements or shutters of an LCD) and a emitter control signals (e.g. for individual emitters comprising the backlight).

As will be discussed further herein, this embodiments firstly determines the LCD image values prior to, or concomitantly with, determining the target backlight values. This order of processing will tend to mitigate the step of clipping LCD as discussed above. With this embodiment—re-arranging the order of the steps by first determining an optimal solution to the LCD, and then compensating with the backlight as well as possible—this processing may result in errors only in low-frequency portions of the signal where they are less noticeable.

In this embodiment, it is possible to determine an optimal LCD image that is within the dynamic range limitations of the hardware, and then determine backlight drive values to increase the dynamic range according to the desired input signal. This embodiment tends to handle at any errors as low frequency and masked by the high frequency detail that is displayed correctly on the LCD. It also tends to avoid affecting the light field simulation, which was the most computationally expensive portion of previous algorithms.

In this and other embodiments, it is possible to generate the LCD image directly by appropriately tone-mapping the target image to affect the following:
(1) Preserve the high-spatial frequency detail of the target image (avoid clipping)
(2) Preserve the overall luminance and colors of the target image
(3) Minimize power consumption by driving the LCD as open as possible
(4) From a tone-mapped image, it is possible to compute a target backlight by subtracting it from the target image. The final step is to generate backlight drive signals to achieve the target backlight as closely as possible.

OTHER EMBODIMENTS AND EXEMPLARY in block 404, this and other embodiments determine the LCD image from the target image. In some embodiments, this may be affected by splitting the target image into a base layer and a detail layer. The base layer comprises the low spatial frequency information that may be appropriate for the backlight. The remaining high spatial frequency detail may then be allocated to the LCD—e.g., as a multi-scale tone mapping, which may be used to reduce the dynamic range of the image. This technique tends to exploit the property that human vision is less sensitive to inaccuracies over large spatial frequencies so long as local spatial detail is preserved.

To generate a base layer for the backlight, it is possible in some embodiments to convolve the image by the point spread function of each LED. The resulting base layer image would tend to be within the spatial capabilities of our backlight.

$$\text{Base} = \text{PSF} * \text{Target} \qquad \text{Equ. 2}$$

where * denotes 2D convolution

However, this processing amounts to a 2D convolution with a potentially large spatial kernel, which may be appropriate for a display system with adequate memory and computational requirements. However, this processing may not simulate the backlight, which may utilize high accuracy and precision; but, instead, this processing just generates a low-pass filtered version of our target image. If the need for high accuracy may be relaxed to some degree, then eliminating the need for high accuracy allows the making of many simplifications to this step without introducing image artifacts.

In other embodiments, two efficient approaches for simplifying the low pass filter step might be:
(1) Translate the input image into the frequency domain using a fast Fourier transform, perform a multiplication, and then return to the spatial domain (0.20 s or 80× faster). This method tends to preserve the same accuracy as the convolution in the spatial domain but may be faster for certain hardware configurations.
(2) Down-sample the input image to a lower resolution, convolve with a low pass filter, then up-sample (0.06 s or 270× faster). This method may be even faster and may be implemented on most hardware configurations.

Figure 5A:
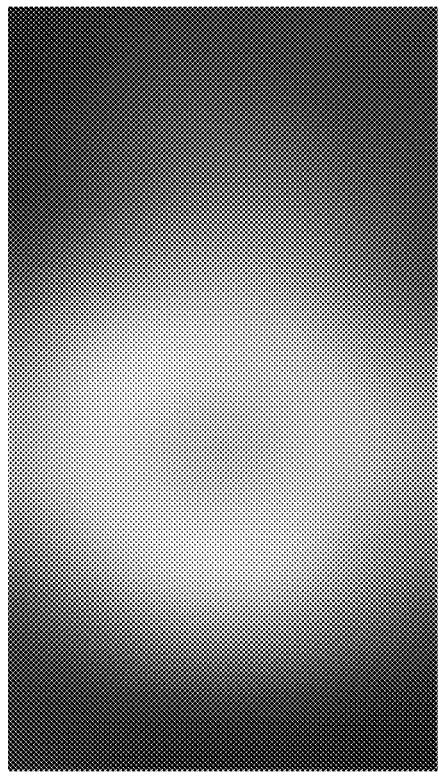
FIGS. 5A and 5B show an illustration of an exemplary target image and the resulting base layer respectively.
Figure 5B:

There are many other possible approaches and embodiments, such as optimizing image filtering with large spatial kernels. Since the backlight may not have color in some embodiments, it may be possible to simplify this step by performing it on a single monochrome channel. FIGS. 5A and 5B show an illustration of a target image and the resulting base layer respectively.

In one embodiment, once the low frequency base layer is determined, it is possible to compute the high frequency detail layer required to regenerate the target image. One such computation might comprise:

$$\text{Detail} = \text{Target}/\text{Base} \qquad \text{Equ. 3}$$

Figure 6A:
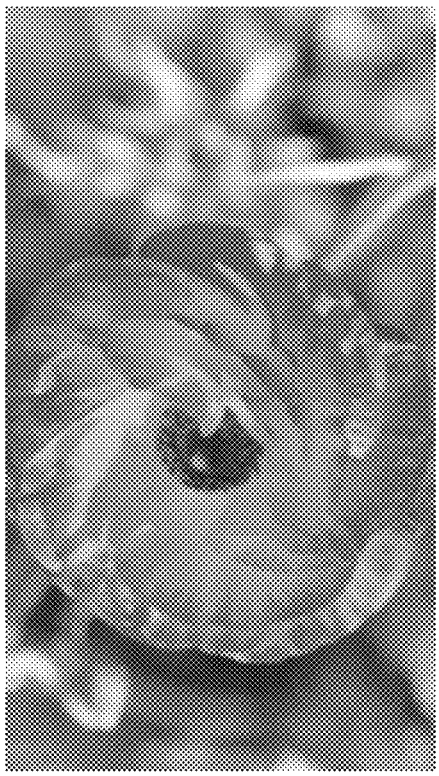
FIGS. 6A and 6B show the detail layer and the tone-mapped detail layer of the exemplary target image respectively.
Figure 6B:
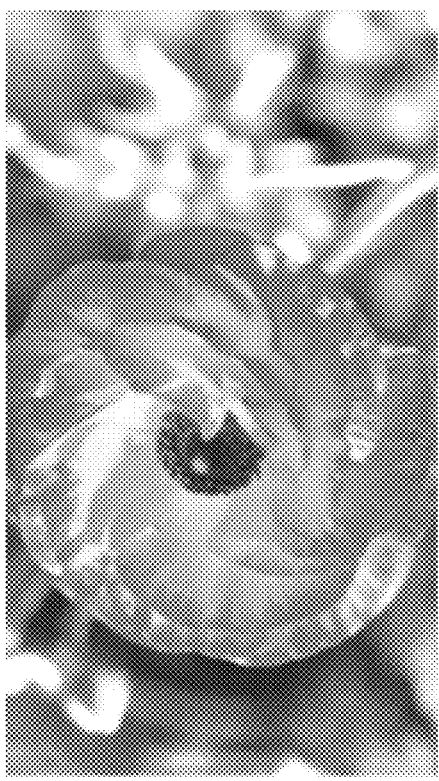

In regions with low spatial frequencies, the base layer will tend to match the target image and the detail layer will be one. This is the result that it may be desirable to ensure that the LCD is substantially fully open whenever possible. If the target is darker than the low frequency base layer, then the detail layer may correct for this by dropping below one. Where the target is brighter than the base layer, the detail layer will extend to a value greater than one. This will tend to occur for small highlights that are brighter than the local average. This may be seen in some of the stems and leaves in FIGS. 6A and 6B, where FIG. 6A shows the detail layer in this exemplary and FIG. 6B shows a tone-mapped detail layer. If the detail layer were used directly as the LCD signal, the details in the stems in the detail layer of FIG. 6A would tend to be clipped to one, eliminating much fine detail.

Figure 7:
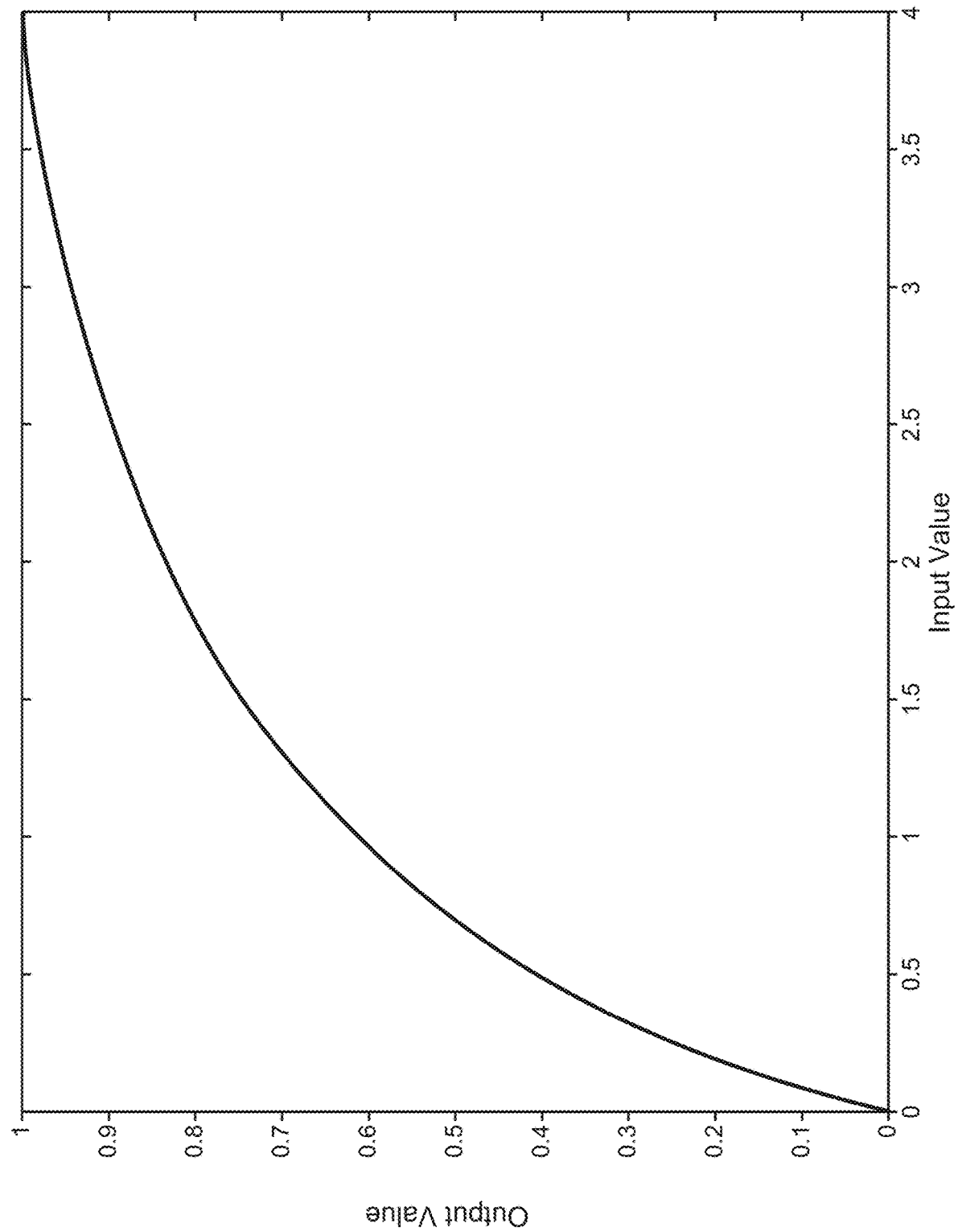
FIG. 7 is one embodiment of a tone mapping curve that may be applied to the detail layer.

In another embodiment, a more sophisticated approach to dealing with values greater than one may be to tone map the detail layer into the valid range (0:1) of the LCD. Any global or local tone mapper may suffice for this step. In this embodiment, it is possible to apply a global tone curve to each of the R, G, B channels, as illustrated in FIG. 7. The tone curve tends to reduce the contrast of increasingly bright pixels without clipping detail.

$$\text{Detail}_{TM} = \frac{c_1 * \text{Detail}}{1 + c_2 * \text{Detail}} \qquad \text{Equ. 4}$$

In one embodiment, the tone curve parameters $c_1$, $c_2$ may be calculated for each frame based on the minimum and maximum values in the detail layer, or alternatively, may be defined as constant for all images. The resulting image may be used as the signal to the LCD. This LCD signal may be as open as possible in regions of low spatial frequency and may contain substantially all the detailed information of the original image.

Now that a desired LCD signal has been established, it is possible to determine the backlight drive values that will tend to restore as much as possible of the original intensities and dynamic range of the input image. It may not be possible to use the base layer that was generated in Equ. 1 directly—as some of the pixel values may have been altered when the detail layer was tone mapped. Instead, it is possible to re-compute a base layer from the target image and the LCD layer (or otherwise the detail layer) from the previous step. This also contrasts with previous algorithms, where the LCD layer is computed last by dividing the light field simulation. In some embodiments, it is also possible to account for light leakage through the LCD due to the limited contrast ratio CR.

$$\text{Base} = \text{Target}/(\text{LCD} \cdot (1-\text{CR}) + \text{CR}) \qquad \text{Equ. 5}$$

Figure 9:
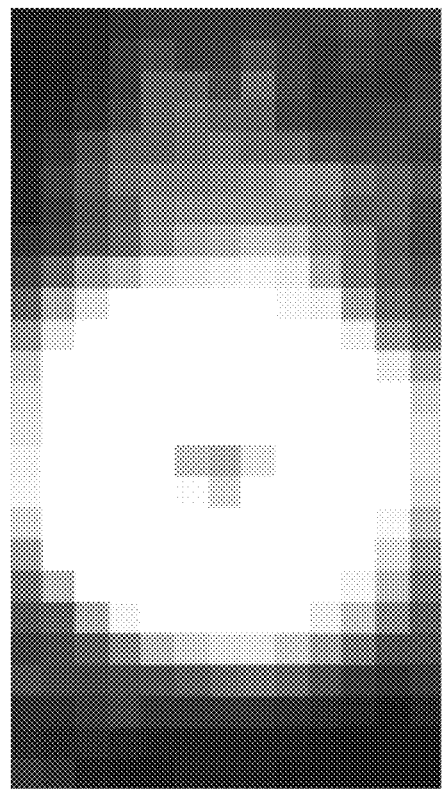
FIG. 9 depicts backlight drive values for rendering the exemplary image.
Figure 8:
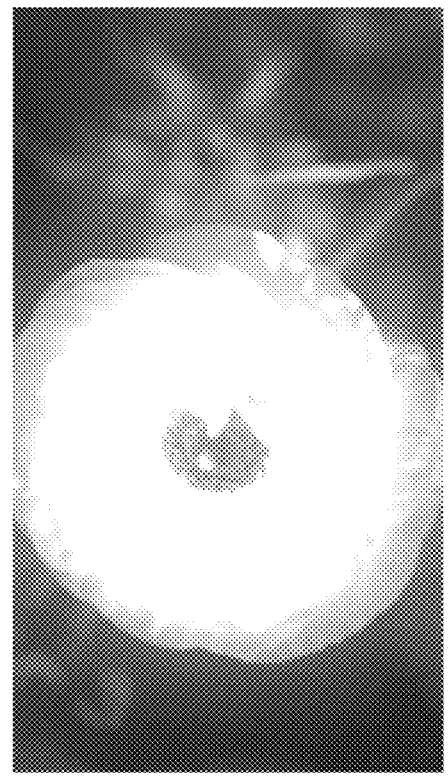
FIG. 8 depicts a new base layer for the exemplary image.

FIG. 8 depicts the new base layer in the exemplary given herein. Finally, the base layer image may be used to calculate backlight drive values. For this step, it is possible to borrow the same solution used in previous approaches, as there is no substantial difference in algorithm goals. FIG. 9 depicts the backlight drive values for the exemplary given herein.

In yet another embodiment, the following system and/or method may be affected as follows:

1. Input the target image data (e.g. a full resolution HDR image);
2. Determine the LCD layer image data by tone-mapping the target image data down to the LCD native range;
3. Determine the backlight modulation image (e.g., LED layer image data) by dividing the target image data input by the LCD layer;
4. Send LCD layer image data and LED layer image data to the LCD panel and the LED/emitters as appropriate control signals to the LCD and the backlight respectively.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A display system, said display system comprising:
   a backlight, said backlight configured to emit a locally dimmable light field according to backlight control signals;
   a set of modulating elements controlled by display control signals;
   a controller, said controller configured to receive target image data, the controller further configured to:
   calculate the display control signals;
   calculate target backlight illumination data from the display control signals and the target image data;
   calculate the backlight control signals from said target backlight illumination data;
   send the backlight control signals to the backlight;
   and send the display control signals to the modulating elements.

2. The display system of claim 1 wherein said controller further configured to determine a display modulator layer image data by tone mapping said target image data.

3. The display system of claim 2 wherein said controller further configured to determine a backlight layer image data by dividing said target image data by said display modulator layer image data.

4. The display system of claim 3 wherein said controller further configured to send the backlight control signals as a function of the display modulator layer image data.

5. The display system of claim 4 wherein said controller further configured to send display control signals as a function of said display modulator layer image data.

* * * * *